United States Patent Office 3,819,672
Patented June 25, 1974

3,819,672
FOAMING UNSATURATED POLYESTER RESINS
Wallace G. Joslyn, Midland, Mich., assignor to Dow Corning Corporation, Midland, Mich.
No Drawing. Filed July 12, 1971, Ser. No. 162,017
Int. Cl. C07f 7/10
U.S. Cl. 260—448.2 N          10 Claims

ABSTRACT OF THE DISCLOSURE

Unsaturated polyester resin foams are prepared with the aid of a profoamer which is a copolymer consisting essentially of (a) $SiO_2$ units, (b) $(CH_3)_3SiO_{1/2}$ units and (c) 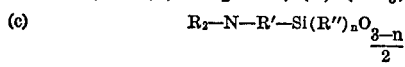

units wherein $n$ has a value from 0 to 2, $R''$ is an alkyl radical containing from 1 to 18 carbon atoms, $R'$ is an alkylene radical containing from 1 to 18 carbon atoms and each R is selected from the group consisting of the hydrogen atom, alkyl radicals containing from 1 to 18 carbon atoms and aminoalkyl radicals containing from 2 to 18 carbon atoms, the ratio of the (b) units to the sum of the (a) and (c) units in the copolymer being in the range of 0.4:1 to 1.2:1.

---

This application relates to unsaturated polyester resin foams, their preparation, and a profoamer therefor.

Unsaturated polyester resins are well known materials and much has been written about them in the technical literature. Probably the most commonly used unsaturated polyester resins today are produced by the condensation of an unsaturated dicarboxylic acid, such as maleic or fumaric acid, with a glycol or mixture of glycols, such as ethylene glycol, propylene glycol, diethylene glycol, dipropylene glycol, bisphenol A, or butylene glycol.

Saturated acids, for example, phthalic, sebacic or adipic acids, are sometimes included in the composition to reduce the amount of unsaturation in the final product, making it tougher and more flexible.

There is usually added to the unsaturated polyester resin a vinylic monomer. The vinylic monomer serves as a solvent or diluent for the unsaturated polyester and as a comonomer therefor. These vinylic monomers are generally referred to as cross-linking agents for the unsaturated polyesters but sometimes are also called diluents. Those vinylic monomers which tend to copolymerize rather than homopolymerize are by far the best. Styrene and diallyl phthalate are probably the leading materials used for this purpose. Illustrative of the other vinylic monomers which can be used are alpha-methyl styrene, vinyl toluene, phenyl alpha-methyl styrene ketone, divinyl benzene, vinyl acetate, vinyl 2-chloroethyl ether, N-vinyl pyrrolidone, 2-vinyl pyridine, chlorostyrene, methyl methacrylate and triallyl cyanurate. The term "unsaturated polyester resin" or its equivalents as used herein is intended to include not only the resin per se but also the combination of the resin with a solvent or diluent as they are commonly marketed.

The polymerization of the unsaturated polyester to obtain the final product is carried out with the aid of an initiator which can be, for example, benzoyl peroxide, 2,4-dichlorobenzoyl peroxide, methyl ethyl ketone peroxide, cyclohexanone peroxide or cumene peroxide.

In addition one can employ catalysts or inhibitors in the unsaturated polyester to control the rate of polymerization. Cobalt naphthenate acts as an accelerator for the hydroperoxides and dimethylaniline for the peroxides. Hydroquinone is illustrative of the inhibitors which can be used to prevent premature cross-linking, and to improve the shelf-life of the uncatalyzed polyester resin.

The polyester resin foams can also be cured by other techniques such as radiation curing, microwave heating, radio frequency heating, or any other method which generates free radicals.

The properties of unsaturated polyester resin products can be varied by several techniques. For example, fillers can be added to improve the strength and/or reduce the cost. Examples of reinforcing fillers include fibrous materials such as glass, quartz, cotton, asbestos, ramie, sisal and alpha-cellulose. Bulk fillers used primarily to reduce cost and improve handling properties are illustrated by clays, ground shell flours, perlite, silicates, carbonates, silicas, aluminas and titanias. Another means of modifying unsaturated polyester resin products is to incorporate long-chain monocarboxylic acids to the formulation which increases the elasticity of the polyester chain. These and other means of modification and variations, such as additives to eliminate shrinkage or improve impact strength, are well known to those skilled in the art.

By current techniques it is very difficult to make satisfactory unsaturated polyester resin foams. With the beginning of polymerization a stiff gel forms which is not readily expanded by foaming agents. Various means have been developed to overcome this phenomenon, however, there still remain problems with foam collapse and/or coalescence, foam viscosity, and foam density which have prevented a substantial, widespread, commercial use of unsaturated polyester resin foams.

It is desirable to make unsaturated polyester resin foams because they can offer advantages over other resinous foams such as low density, high strength, high stiffness, good insulating properties, good weatherability, good water resistance and ease of fabrication. Thus unsaturated polyester resin foams are useful as insulation, for making artificial wood products such as table tops and cabinet doors, for buoyancy as under boat seats and inside the boat hull, and as cushioning in furniture seats and backs and in automobile crashpads.

It is an object of this invention to provide a new and improved process for preparing foams from unsaturated polyester resins.

Another object of this invention is to provide a composition useful for making unsaturated polyester resin foams.

Yet another object of this invention is to provide a profoamer additive useful in making unsaturated polyester resin foams.

The above and other objects and advantages of this invention will be apparent to those skilled in the art from the following description and examples.

It has been found in accordance with this invention that when a certain siloxane copolymer is employed in an unsaturated polyester resin foam composition that the resulting foam is markedly better than foams made without the aid of the siloxane copolymer.

More specifically, this invention relates to a process for preparing unsaturated polyester resin foams which comprises adding to the unsaturated polyester resin a siloxane copolymer consisting essentially of (a) $SiO_2$ units, (b) $(CH_3)_3SiO_{1/2}$ units and (c) 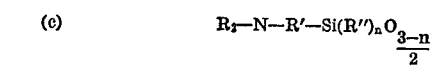

units wherein $n$ has a value from 0 to 2, $R''$ is an alkyl radical of 1 to 18 carbon atoms, $R'$ is an alkylene radical of 1 to 18 carbon atoms and each R is selected from the group consisting of the hydrogen atom, alkyl radicals of 1 to 18 carbon atoms and aminoalkyl radicals of 2 to 18 carbon atoms, the ratio of the (b) units to the sum of the (a) and (c) units being in the range of 0.4:1 to 1.2:1, thereafter expanding the polyester resin with a gas, and finally curing the polyester resin while in the expanded state.

Put another way, this invention relates to an improvement in a process of preparing unsaturated polyester resin foams which includes the steps of expanding the polyester resin with a gas and thereafter curing the polyester resin while in the expanded state, the improvement comprising incorporating a siloxane copolymer as defined above into the polyester resin composition prior to its expansion with a gas.

This invention also relates to a composition for making unsaturated polyester resin foams which comprises (1) a profoamer for the polyester resin foam composition which is a copolymer consisting essentially of (a) $SiO_2$ units, (b) $(CH_3)_3SiO_{1/2}$ units, and (c) $R_2N—R'—Si(R'')_nO_{\frac{3-n}{2}}$ units wherein $n$ has a value from 0 to 2, R'' is an alkyl radical containing from 1 to 18 carbon atoms, R' is an alkylene radical containing from 2 to 18 carbon atoms, and each R is selected from the group consisting of the hydrogen atom, alkyl radicals containing from 1 to 18 carbon atoms, and aminoalkyl radicals containing from 2 to 18 carbon atoms, the ratio of the (b) units to the sum of the (a) and (c) units in the copolymer being in the range of 0.4:1 to 1.2:1, and (2) a carrier for the profoamer which is one of the ingredients of the polyester resin foam composition.

This invention further relates to a profoamer for polyester resins which is a siloxane copolymer consisting essentially of (a) $SiO_2$ units, (b) $(CH_3)_3SiO_{1/2}$ units and (c) $R_2—N—R'—Si(R'')_nO_{\frac{3-n}{2}}$.

units wherein $n$ has a value from 0 to 2, R'' is an alkyl radical containing from 1 to 18 carbon atoms, R' is an alkylene radical containing from 1 to 18 carbon atoms and each R is selected from the group consisting of the hydrogen atom, alykl radicals containing from 1 to 18 carbon atoms and aminoalkyl radicals containing from 2 to 18 carbon atoms, the ratio of the (b) units to the sum of the (a) and (c) units being in the range of 0.4:1 to 1.2:1.

The siloxane copolymer which is the key to the present invention consists essentially of three different siloxane units designated as (a) (b) and (c) above. The (a) units are unsubstituted silicon atoms and are completely defined by the formula $SiO_2$ which is sometimes written $SiO_{4/2}$. The (b) units have three methyl groups substituted on each silicon atom and are completely defined by the formula $(CH_3)_3SiO_{1/2}$.

It is noted at this point that siloxane copolymers composed only of (a) and (b) units, and siloxane copolymers composed of (a) units and (b) units in which one of the methyl groups has been replaced by a solubilizing group are well known in the art. See for example U.S. Pats. 2,676,182, 2,857,356, 3,205,283, 2,736,721, 2,814,601, 3,527,659 and 3,511,788, the disclosures of which are incorporated herein by reference. Moreover, in the latter patent (3,511,788) the use of such copolymers in preparing plastisol foams and foams from certain organic liquids is disclosed. Copolymers of the type disclosed in these patents are commercially available from several sources and provide a convenient starting material for the preparation of the siloxane copolymers used in this invention as will be described in detail later.

The (c) unit of the siloxane copolymer of this invention has the formula $R_2—N—R'—Si(R'')_nO_{\frac{3-n}{2}}$ In this formula $n$ has a value of from 0 to 2. Thus there can be two, one, or no R'' radicals present on the silicon atom. It is believed at the present time that best results are obtained in accordance with this invention when $n$ is 2. However, the starting materials commercially available at this time make the preparation of copolymers wherein $n$ is 0 the most economical.

In the (c) unit the R'' radical can be any alkyl radical containing from 1 to 18 carbon atoms. By way of example, R'' can be a methyl, ethyl, propyl, isopropyl, butyl, pentyl, hexyl, heptyl, octyl, nonyl, decyl, dodecyl, hexadecyl or octadecyl radical. Preferably R'' contains from 1 to 6 carbon atoms.

The R' radical is divalent and links the silicon atom to the nitrogen atom. This radical can contain from 1 to 18 carbon atoms but preferably contains from 3 to 6 carbon atoms. Illustrative alkylene radicals include the methylene, ethylene, propylene, butylene, isobutylene, pentylene, hexylene, octylene, decylene, dodecylene and octadecylene radicals.

Each R radical, which is attached to the nitrogen atom, can be a hydrogen atom, an alkyl radical containing from 1 to 18 carbon atoms the same as the R'' radical, or it can be an aminoalkyl radical containing from 2 to 18 carbon atoms. Examples of suitable aminoalkyl radicals are $H_2NCH_2CH_2—$, $H_2N(CH_2)_3CH_2—$, $H_2N(CH_2)_4CH_2—$, $H_2N(CH_2)_5CH_2—$, $H_2N(CH_2)_{17}CH_2—$, $H_2NCH_2CH_2NHCH_2CH_2—$, $H_2N(CH_2)_3NH(CH_2)_4NH(CH_2)_2CH_2—$ and $H_2NCH_2CH(CH_3)CH_2—$. It is preferred that at least one R radical be a hydrogen atom, that when it is an alkyl radical it has 1 to 6 carbon atoms, and when it is an amionoalkyl radical it has 2 to 6 carbon atoms.

The siloxane copolymers of this invention can be prepared by several methods. For example, they can be prepared by the cohydrolysis and condensation of an appropriate mixture of $SiX_4$, $(CH_3)_3SiX$ and $R_2—N—R'—Si(R'')_nX_{3-n}$ silanes wherein X is a hydrolyzable group other than a halogen atom, such as a methoxy, ethoxy or propoxy group.

Another method of preparing such siloxane copolymers is by the cohydrolysis and condenstaion of an appropriate mixture of $SiX_4$, $(CH_3)_3SiX$ and $Cl—R'—Si(R'')_nX_{3-n}$ silanes and subsequently reacting an amine with the $Cl—R'—$ radical to convert it to the $R_2—N—R'—$ radical.

Still another method by which these siloxane copolymers can be made is by the cohydrolysis and condensation of an appropriate mixture of $SiX_4$, $(CH_3)_3SiX$ and $NC—R'—Si(R'')_nX_{3-n}$ silanes and subsequently reducing the cyano group of the $NC—R'—$ radical to convert it to the $H_2N—R'—$ radical.

The best method that is known at this time for the preparation of these siloxane copolymers is by the reaction of one of the commercially available siloxane copolymers composed of $SiO_2$ and $(CH_3)_3SiO_{1/2}$ units with a silane of the formula $R_2—N—R'—Si(R'')_nX_{3-n}$. These commercially available siloxane copolymers inherently contain varying amounts of residual silanol (Si—OH)

groups which react with the hydrolyzable groups of the silane at room temperature or elevated temperatures to yield the siloxane units.

(c) $R_2—N—R'—Si(R'')_nO_{\frac{3-n}{2}}$

Since it has been found for some unknown reason that the best results are obtained with a siloxane copolymer which has been aged for 2 to 4 days, it is simplest to merely mix the reactants at room temperature and allow them to stand for the requisite time.

The amount of siloxane copolymer added to the unsaturated polyester resin to obtain a good foam will vary depending on the exact make-up of the foam composition. Generally speaking, at least 0.025% by weight of the siloxane copolymer, based on the weight of the foam composition, will be used. The amounts employed will usually fall within the range of 0.025% to 7.5% by weight of the siloxane. Larger amounts can be used but rarely offer any advantage and are economically unattractive. Stated another way, when the foam is produced by mechanical frothing the amount of profoamer used will be about 0.25 to 7.5 parts (preferably 1 to 4 parts) per hundred parts of polyester resin, and when the foam is produced by chemical blowing the amount of profoamer used will be about 0.025 to 7.5 parts (preferably 0.125 to 2 parts) per hundred parts of polyester resin.

So far as is known at this time there is no preferred time or manner of adding the siloxane copolymer to the unsaturated polyester resin foam composition. All that is required is that it be added prior to the expansion of the composition with a gas. The siloxane copolymer can be added neat or in admixture with one of the other components.

The particular method by which the unsaturated polyester resin composition is expanded with a gas to form the foam will depend on the available equipment and individual preferences. The numerous ways in which gas is incorporated into composition to foam them are well known in the art. These ways include, for example, the chemicals which release a gas under the desired conditions and called blowing agents in the art; bubbling a gas into the material; and mechanically beating or whipping air or another gas into the composition. Any gas can be used to expand the unsaturated polyester resin composition which produces no undesirable effects on the resulting or desired product. Typical examples of the gases used are air, nitrogen, carbon dioxide and the halogenated hydrocarbons such as dichlorodifluoromethane.

After the polyester resin composition has been expanded to form a foam, the composition is then cured using one of the known techniques. It is noted that all polyesters liberate heat during cure. The curing may be done at room temperature or elevated temperatures. The particular method of curing will be dependent upon the particular operation, available facilities and individual preferences.

Now in order that those skilled in the art may better understand how the present invention can be practiced, the following examples are given by way of illustration and not by way of limitation. All parts and percents referred to herein are on a weight basis, and all viscosities measured at 25° C. unless otherwise specified.

In the examples where the following tests are referred to they were conducted in the manner described below unless otherwise specified. In all tests the profoamer was used at 4 parts of the siloxane copolymer per se per hundred parts of the unsaturated polyester resin (4 p.p.h.) unless otherwise specified.

VIAL TEST

In this test the profoamer was placed in 10 g. of polyester resin in a ½ oz. vial and sparged with air from an eye dropper. A rating of 1 to 5 was given based on the height of foam in the vial. A rating of 1 represents foam to the top of the vial while a rating of 5 represents no foam at all. This is a screening test which gives some indication as to how the profoamer will perform in the Hobart test.

HOBART TEST

In this test 100 parts of the polyester resin and the profoamer were charged to the mixing bowl of a Hobart mixer and mixed at speed setting number six for ten minutes. A sample of the foam is then used to fill an aluminum evaporation cup which is then weighed to obtain the "cup weight" which gives an indication of the foam density. The capacity of the aluminum cup is 42 g. of water. The cup weight (in grams) can be converted to an approximate density (in pounds per cubic foot) by multiplying the cup weight by a factor of 1.48. In another sample of the foam a ¼ inch deep V-groove is made with a spatula or other similar insrument and the time for the sharpness of the groove to disappear is reported as the "slash time." This latter test gives a good indication of the foam viscosity.

SOLUBILITY TEST

In this test the profoamer was placed in 10 g. of the unsaturated polyester resin in a ½ oz. vial and mixed thoroughly. A rating of 1 means a water clear solution was obtained and a rating of 5 means that visible insoluble particles were present. This is another screening test. So far as is known at this time, best results and the most stable foams are obtained when the profoamer is only partially soluble or dispersible in the system rather than completely so.

FOAM HALF LIFE TEST

In this test a sample of the frothed resin system prepared in the Hobart Test is placed in a ½ oz. vial and the elapsed time that it takes for ½ of the froth to revert to a liquid is noted. To get meaningful results from this test it is necessary to tap the test vials on a bench or desk at intervals to dislodge the foam from the glass sidewalls and allow proper drainage.

DRAINAGE TIME TEST

In this test a sample of the frothed resin system prepared in the Hobart Test is placed in a ½ oz. vial and the elapsed time for a 1/16 inch liquid layer to form on the bottom of the vial noted. Tapping is necessary while conducting this test as is with the foam half life test as noted above.

Example 1

To a 500 ml. three-necked flask equipped with a thermometer, air-driven glass stirrer, barret trap, heating mantle, reflux condenser and nitrogen purge there was added 204 g. of a xylene solution (74.5% solids) of a copolymer consisting essentially of $SiO_2$ units and $(CH_3)_3SiO_{1/2}$ units, and 60 g. of

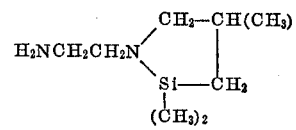

The mixture was stripped to 183° C. over a period of 2 and ⅓ hours and then heating stopped. When the reaction mixture had cooled to 160° C., 50 g. of xylene was added and mixed in. The product was a xylene solution (75% solids) of a copolymer consisting essentially of (a) $SiO_2$ units, (b) $(CH_3)_3SiO_{1/2}$ units and (c)

$H_2NCH_2CH_2NHCH_2CH(CH_3)CH_2Si(CH_3)_2O_{1/2}$ units in which the ratio of the (b) units to the sum of the (a) and (c) units was in the range of 0.4:1 to 1.2:1.

The above prepared profoamer solution was used in the Hobart Test at 6 p.p.h. to prepare an unsaturated polyester resin foam. The polyester resin used was a methacrylic acid modified epoxy resin diluted with styrene, there being 50% resin and 50% styrene in the product used. This product has a specific gravity of 1.05 and a viscosity of 150 cps. and is sold by the Dow Chemical Company under the number 3923.50. The foam cup weight was 31 g. The foam half life in that test was about 40 minutes.

The profoamer solution was then diluted with xylene to a 33% solids content and used at 2.65 p.p.h., and the above tests repeated. The foam made from the diluted profoamer had a cup weight of 26 g. and a half life of 20 minutes.

Example 2

To a 500 ml. flask equipped as in the preceding example and with a dropping funnel there was added 204 g. of a xylene solution (74.5% solids) of a copolymer consisting essentially of $SiO_2$ units and $(CH_3)_3SiO_{1/2}$ units. This solution was heated to 134° C. in about 25 minutes during which time water azeotroped from the system as the solution refluxed. Then the addition of 45 g. of the amino-functional cyclic silane used in Example 1 was begun from the dropping funnel at the rate of about 120 drops per minute. The addition was complete in about 2 and ¼ hours during which time the temperature ranged from 132° to 144° C. After the addition was complete, stirring was continued for another 10 minutes at 144° C. and then stopped and the solution cooled to room temperature. The product was a xylene solution of a copolymer consisting essentially of (a) $SiO_2$ units, (b)

$$(CH_3)_3SiO_{1/2}$$

units and (c)

$$H_2NCH_2CH_2NHCH_2CH(CH_3)CH_2Si(CH_3)_2O_{1/2}$$

units in which the ratio of the (b) units to the sum of the (a) and (c) units was in the range of 0.4:1 to 1.2:1. The profoamer solution obtained was diluted with xylene to a 33% solids content and a polyester resin foam made as in the preceding example with the profoamer concentration being 2.65 p.p.h. The foam had a cup weight of 21.8 g. and a half life of 10 minutes.

Example 3

To a ½ oz. vial there was added 10 g. of a xylene solution (50% solids) of a copolymer consisting essentially of $SiO_2$ units and $(CH_3)_3SiO_{1/2}$ units, said copolymer having been bodied by heating it with KOH. There was also added 1.5 g. of the amino-functional cyclic silane of Example 1, and then the mixture was allowed to stand at room temperature for 16 hours. The product was a xylene solution of a copolymer consisting essentially of (a) $SiO_2$ units, (b) $(CH_3)_3SiO_{1/2}$ units and (c)

$$H_2NCH_2CH_2NHCH_2CH(CH_3)CH_2Si(CH_3)_2O_{1/2}$$

units in which the ratio of the (b) units to the sum of the (a) and (c) units was in the range of 0.4:1 to 1.2:1. Using the same unsaturated polyester resin as in Example 1 and 4 p.p.h. of the profoamer to make a foam in the Hobart test, the foam had a cup weight of 11.2 g. and a slash time of 1.5 minutes. The foam half life was 1 and ½ hours and the drainage time 15 to 20 minutes. In the solubility test the profoamer rated 4.

Example 4

The procedure of Example 3 was repeated except that 1 g. of the amino-functional cyclic silane was used to make the copolymer. Also, the polyester resin used to make the foam contained 60% resin and 40% styrene. This product is sold as Derakane 114 by The Dow Chemical Company. The profoamer concentration was 4 p.p.h. The foam prepared in the Hobart test had a cup weight of 26 g., a half life of 30 minutes, and a drainage time of 5 minutes. In the solubility test the profoamer rated 4.

Example 5

The procedure of Example 4 was repeated except that the unsaturated polyester resin used to make the foam was one sold under the trademark Aropol Wep 33 by the Ashland Chemical Company. The profoamer concentration was 4 p.p.h. The foam prepared in the Hobart test had a cup weight of 11.0 g. a half life of one hour and a drainage time of 10 minutes. The slash time was 1 and ½ minutes. In the solubility test the profoamer rated 3.

Example 6

The procedure of Example 4 was repeated except that the unsaturated polyester resin used to make the foam was an isophthalic based resin sold under the trademark Dion-Iso DR–315 by the Diamond Shamrock Chemical Company. By way of illustration the resin reacted with the amino-functional silane to make the profoamer was prepared as follows. To a 500 ml. three-necked flask equipped with a thermometer agitator barret trap and condenser there was added 270 g. of a xylene solution (74.4% solids) of a copolymer consisting esstntially of $SiO_2$ and $(CH_3)_3SiO_{1/2}$ units. 130 g. of xylene, and 3.6 g. of 1 N KOH. This mixture was heated at reflux (~130° C.) with continuous water removal for 4 hours, and then cooled. Half of the solution was then neutralized with 9.5 g. of acid clay and then filtered. The resulting product, used to make the profoamer of this example, had 0.10% free O groups, 0.69% total OH groups and 64 parts per million K ions. The foam prepared using 4 p.p.h. profoamer in the Hobart test had a cup weight of 18.6 g., a half life of one hour, and a drainage time of 20 minutes. The slash time of the foam was 10 seconds. In the solubility test the profoamer rated 4.

Example 7

To a 500 ml. three-necked flask equipped as in Example 1 there was added 134 g. of a xylene solution (74.5% solids) of a copolymer consisting essentially of $SiO_2$ units and $(CH_3)_3SiO_{1/2}$ units, 66 g. of xylene and 49 g. of $H_2NCH_2CH_2NH(CH_2)_3Si(CH_3)(OCH_3)_2$. This mixture was heated to 134° C. over a period of about 25 minutes during which time 15 ml. of methanol was removed. The product was then cooled and filtered to obtain a clear, straw-yellow solution. The product was a xylene solution (58.1% solids) of a copolymer consisting essentially of (a) $SiO_2$ units, (b) $(CH_3)_3SiO_{1/2}$ units and (c)

$$H_2NCH_2CH_2NH(CH_2)_3Si(CH_3)O$$

units in which the ratio of the (b) units to the sum of the (a) and (c) units was in the range of 0.4:1 to 1.2:1.

The above prepared profoamer solution was diluted with xylene to 33% solids and then used to prepare an unsaturated polyester resin foam as in Example 1 with profoamer concentration being 2.65 p.p.h. In the Hobart test the foam had a cup weight of 24.5 g., a half life greater than 30 minutes, and a nil slash time. In the solubility test the profoamer rated 1.

Example 8

The procedure of Example 7 was repeated except that only 11.2 g. of the amino-functional silane was used in preparing the copolymer and 18 ml. of methanol was removed.

The above prepared profoamer solution was diluted with xylene to 33% solids and then used to give 2.65 p.p.h. profoamer to prepare an unsaturated polyester resin foam as in Example 1. In the Hobart test the foam had a cup weight of 26.0 g., a half life greater than 5 minutes, and a nil slash time. In the solubility test the profoamer rated 3.

Example 9

The procedure of Example 7 was repeated except that only 32.5 g. of the amino-functional silane was used in preparing the copolymer and the mixture was heated to 194° C. over a period of about 55 minutes with about 95 ml. of methanol and xylene being removed. Upon cooling to about 150° C. the mixture became very thick and then solidified. 80 g. of xylene was added and the mixture heated at 90° C. to obtain a cloudy solution which did not clear up after filtering.

The above prepared profoamer solution (50% solids) was used to give 4 p.p.h. profoamer to prepare an unsaturated polyester resin foam as in Example 1. In the Hobart test the foam had a cup weight of 22.6 g. and a half life of 15 minutes. In the solubility test the profoamer rated 4.

Example 10

To a 500 ml. flask equipped as in Example 1, there was added 200 g. of a xylene solution (50% solids) of a copolymer consisting essentially of $SiO_2$ units and $(CH_3)_3SiO_{1/2}$ units, said copolymer having been bodied by heating it with KOH, and 12.4 g. of $H_2NCH_2CH_2NH(CH_2)_3Si(CH_3)(OCH_3)_2$ This mixture was heated to 140° C. over a period of about 35 minutes during which time about 65 ml. of methanol was removed. When the mixture had cooled to about 100° C., 70 g. of xylene was added, cooling completed, and then the product filtered to obtain a xylene solution (50% solids) of a copolymer consisting essentially of (a) $SiO_2$ units, (b) $(CH_3)_3SiO_{1/2}$ units, and (c) $H_2NCH_2CH_2NH(CH_2)_3Si(CH_3)O$ units in which the ratio of (b) units to the sum of (a) and (c) units is in the range of 0.4:1 to 1.2:1.

The above prepared profoamer solution was used to give 4 p.p.h. profoamer to make an unsaturated polyester resin foam as in Example 1. In the Hobart test the foam had a cup weight of 10.6 g., a half life of 30 minutes, and a slash time of 30 to 40 seconds. The drainage time was 10 minutes and in the solubility test the profoamer rated 4.

The foregoing procedure was repeated using only half as much profoamer, i.e. 2 p.p.h., to make the foam. In the Hobart test this foam had a cup weight of 17.6 g., a half life of 40 minutes, and a drainage time of 15 minutes.

The above prepared profoamer solution was also used at 4 p.p.h. of profoamer to make an unsaturated polyester resin foam using the resin of Example 6. In the Hobart test this foam had a cup weight of 19.0 g., a half life of 2 hours and a slash time of 5 seconds. The drainage time was 10 minutes.

Example 11

To a ½ oz. vial there was added 10 g. of a xylene solution (50% solids) of a copolymer consisting essentially of $SiO_2$ units $(CH_3)_3SiO_{1/2}$ units, said copolymer having been bodied by heating it with KOH, and 1.0 g. of $H_2NCH_2CH_2NH(CH_2)_3Si(CH_3)(OCH_3)_2$. This mixture was allowed to stand at room temperature for 16 hours to obtain a xylene solution of a copolymer consisting essentially of (a) $SiO_2$ units, (b) $(CH_3)_3SiO_{1/2}$ units and (c) $H_2NCH_2CH_2NH(CH_2)_3Si(CH_3)O$ units in which the ratio of (b) units to the sum of the (a) and (c) units is in the range of 0.4:1 to 1.2:1. Then this copolymer solution was used as a profoamer at 4 p.p.h. to make an unsaturated polyester resin foam as in Example 1. In the Hobart test the foam had a cup weight of 12.6 g., a half life of 1 hour, and a slash time of 30 seconds. The drainage time was 10 minutes and in the solubility test the profoamer rated 4.

Example 12

The procedure of Example 11 was repeated except that only 0.5 g. of the amino-functional silane was used to make the profoamer copolymer, and only 2 p.p.h. of the profoamer copolymer was used in making the foam. In the Hobart test the foam had a cup weight of 23.6 g., a half life of 1 hour, and a slash time of 30 seconds. The drainage time was 5 minutes and in the solubility test the profoamer rated 4.

Example 13

The procedure of Example 11 was repeated except that only 0.5 g. of the amino-functional silane was used to make the profoamer copolymer, and the unsaturated polyester resin of Example 6 was used in making the foam. Also the profoamer concentration was 4 p.p.h. In the Hobart test the foam had a cup weight of 16.0 g. and a half life of 1 hour. The drainage time was 15 minutes and in the solubility test the profoamer rated 4.

Example 14

To a ½ gallon bottle there was added 1500 g. of a xylene solution (50% solids) of a copolymer consisting essentially of $SiO_2$ units and $(CH_3)_3SiO_{1/2}$ units, said copolymer having been bodied by heating it with KOH, and 75 g. of $H_2NCH_2CH_2NH(CH_2)_3Si(CH_3)(OCH_3)_2$. The materials were mixed thoroughly by shaking and then allowed to stand at room temperature for 16 hours to obtain a cloudy xylene solution of a copolymer consisting essentially of (a) $SiO_2$ units, (b) $(CH_3)_3SiO_{1/2}$ units, and (c) $H_2NCH_2CH_2NH(CH_2)_3Si(CH_3)O$ units in which the ratio of the (b) units to the sum of the (a) and (c) units was in the range of 0.4:1 to 1.2:1. This copolymer solution was used as a profoamer to make four unsaturated polyester resin foams following the procedure of Example 1, except that the polyester resin of Example 6 was used and varying amounts of the profoamer were used. The amounts of profoamer used and the test results are set forth in the table below.

| Foam | Profoamer amount (p.p.h.) | Cup weight (grams) | Half life (hours) | Slash time (seconds) | Drainage time (minutes) |
|---|---|---|---|---|---|
| 1 | 4 | 15.2 | 2 | 10 | 20 |
| 2 | 3 | 18.0 | 2 | 7 | 15 |
| 3 | 2 | 22.6 | 2 | 3 | 10 |
| 4 | 1 | 27.0 | 2 | Nil | 7 |

Example 15

The procedure of Example 14 was repeated except that the unsaturated polyester resin used to make the foam contained about 66% resin and 34% styrene. This resin is sold as Koppers' Polyester Resin 3010-5 by the Koppers Company, Inc. The amount of profoamer used was 3.5 p.p.h. In the Hobart test the foam had a cup weight of 29.0 g., a half life of greater than 10 minutes, and a nil slash time. The drainage time was greater than 1 hour and in the solubility test the profoamer rated 4.

Example 16

The procedure of Example 15 was repeated except that the unsaturated polyester resin used to make the foam was 100% resin. This resin is sold as Koppers' Polyester Resin B92-20 by the Koppers Company, Inc. The amount of profoamer used was 3 p.p.h. In the Hobart test the foam had a cup weight of 19.3 g. and a half life greater than 5 hours. The drainage time was 40 minutes and in the solubility test the profoamer rated 3.

Example 17

The procedure of Example 11 was repeated except that 0.5 g. of $(CH_3)HN(CH_2)_3Si(OCH_3)_3$ was used as the aminofunctional silane to obtain a profoamer copolymer consisting essentially of (a) $SiO_2$ units, (b) $(CH_3)_3SiO_{1/2}$ units, and (c) $(CH_3)HN(CH_2)_3SiO_{3/2}$ units in which the ratio of (b) units to the sum of the (a) and (c) units was in the range of 0.4:1 to 1.2:1. In the Hobart test with 4 p.p.h. profoamer, the foam had a cup weight of 21.5 g., a half life of 30 minutes, and a negligible slash time. The drainage time was one minute, and in the solubility test the profoamer rated 4.

Example 18

The procedure of Example 11 was repeated except that 0.5 g. of $(CH_3)HN(CH_2)_3Si(OCH_3)_3$ was used as the aminofunctional silane to obtain a profoamer copolymer consisting essentially of (a) $SiO_2$ units, (b)

$(CH_3)_3SiO_{1/2}$ units and (c) $(C_4H_9)HN(CH_2)_3SiO_{3/2}$ units in which the ratio of (b) units to the sum of the (a) and (c) units was in the range of 0.4:1 to 1.2:1. In the Hobart test with 4 p.p.h. profoamer the foam had a cup weight of 25.3 g., a half life of 30 minutes, and a nil slash time. The drainage time was one minute, and in the solubility test the profoamer rated 4.

Example 19

The procedure of Example 11 was repeated except that 0.5 g. of $H_2NCH_2CH_2NH(CH_2)_3Si(OCH_3)_3$ was used as the amino-functional silane to obtain a profoamer copolymer consisting essentially of (a) $SiO_2$ units, (b)

$(CH_3)_3SiO_{1/2}$ units, and (c) $H_2NCH_2CH_2NH(CH_2)_3SiO_{3/2}$ units in which the ratio of (b) units to the sum of the (a) and (c) units was in the range of 0.4:1 to 1.2:1. In the Hobart test with 4 p.p.h. profoamer the foam had a cup weight of 17.0 g., a half life of 30 minutes, and a slash time of 10 seconds. The drainage time was 5 minutes and in the solubility test the profoamer rated 4.

Example 20

To an 8 oz. Dixie Cup there was added and mixed thoroughly 100 g. of the unsaturated polyester resin of Example 1, 1 g. (0.5 p.p.h.) of the profoamer of Example 11, 30 drops (~0.5 g.) of cobalt napthenate and 10 drops (~0.3 g.) of N,N-dimethyl-p-toluidine. Then 1 g. of methyl ethyl ketone peroxide catalyst was added and thoroughly mixed in. After mixing for another 10 seconds by hand there was added 30 drops (~0.9 g.) of sodium borohydride solution, mixing continued by hand for about 15 seconds, and then the mixture was poured into a 32 oz. Dixie Cup and allowed to free rise and cure at room temperature. The foam rose about 3½ inches, had a gel time of 2 minutes, a density of about 14.5 pounds per cubic foot and fine cells.

The sodium borohydride solution used was prepared by thoroughly mixing 9 g. of distilled water, 20 drops of 1 N alcoholic KOH and 3 g. of sodium borohydride ($NaBH_4$) powder.

Example 21

To the bowl of a Hobart mixer in a nitrogen purged dry box there was added 200 g. of the unsaturated polyester resin of Example 1, 2 g. of cobalt napthenate, 12 g. (3 p.p.h.) of the profoamer of Example 11, 80 g. of clay filler and 20 drops (~0.6 g.) of N,N-dimethyl-p-toluidine. The mixture was mechanically frothed to maximum foam at a speed setting of 6, then the speed setting was reduced to 4 and 2 g. of methyl ethyl ketone peroxide added and mixed in for 30 seconds. The speed setting was then reduced to 1 for 5 minutes to reduce cell size and then the foam poured into a silicone rubber mold. The mold was then covered and the foam allowed to cure at room temperature. The foam gelled in 10 minutes and subsequently cured. The foam was porous and cell growth had taken place during curing. The foam density was about 25 to 30 pounds per cubic foot.

The above procedure was repeated except that the foam was mixed at a speed setting of 1 for 7 minutes prior to being poured into the mold. The foam again gelled in 10 minutes and subsequently cured. This foam had good cell size. The foam density was about 22 pounds per cubic foot.

Example 22

To an 8 oz. Dixie Cup there was added and thoroughly mixed 100 g. of the unsaturated polyester resin of Example 1, 1 g. (0.5 p.p.h.) of the profoamer of Example 11, 35 drops (~0.5 g.) of cobalt napthenate, 20 drops (~0.6 g.) of N,N-dimethyl-p-toluidine, 5 g. of acid clay, 10 g. of ⅛ inch chopped glass fibers and 1 g. of methyl ethyl ketone peroxide. Then 30 drops (~0.9 g.) of the sodium borohydride solution of Example 19 was added and thoroughly mixed in. The foam was then transferred to a 32 oz. Dixie Cup and allowed to free rise and cure at room temperature. The foam gelled in 1½ minutes and rose 3 inches. It had a density of about 17.5 pounds per cubic foot. The foam was composed of fine cells evenly distributed.

Example 23

When profoamer copolymers consisting essentially of (a) $SiO_2$ units, (b) $(CH_3)_3SiO_{1/2}$ units, and the (c) units set forth below, the ratio of the (b) units to the sum of the (a) and (c) units in the copolymers being in the range of 0.4:1 to 1.2:1, are prepared and substituted for the profoamers in the preceding examples, good polyester resin foams are obtained.

(I) $H_2N(CH_2)_3SiO_{3/2}$
(II) $(CH_3)_2N(CH_2)_3SiO_{3/2}$
(III) $H_2NCH_2CH_2NHCH_2CH(CH_3)CH_2SiO_{3/2}$
(IV) $H_2NCH_2CH_2NH(CH_2)_3Si(C_{18}H_{37})O$
(V) $H_2N(CH_2)_6NH(CH_2)_3SiO_{3/2}$
(VI) $(C_{18}H_{37})HN(CH_2)_3SiO_{3/2}$
(VII) $H_2N(CH_2)_3Si(C_2H_5)_2O_{1/2}$
(VIII) $(C_8H_{17})HN(CH_2)_6SiO_{3/2}$
(IX) $(C_2H_5)HNCH_2CH_2SiO_{3/2}$
(X) $(H_2NCH_2CH_2)_2N(CH_2)_4SiO_{3/2}$

That which is claimed is:

1. A profoamer for unsaturated polyester resins which is a copolymer consisting essentially of (a) $SiO_2$ units, (b) $(CH_3)_3SiO_{1/2}$ units, and (c) $$R_2N\text{---}R'\text{---}Si(R'')_nO_{\frac{3-n}{2}}$$

units wherein $n$ has a value from 0 to 2, $R''$ is an alkyl radical containing from 1 to 18 carbon atoms, $R'$ is an alkylene radical containing from 2 to 18 carbon atoms, and each R is selected from the group consisting of the hydrogen atom, alkyl radicals containing from 1 to 18 carbon atoms, and aminoalkyl radicals containing from 2 to 18 carbon atoms, the ratio of the (b) units to the sum of the (a) and (c) units in the copolymer being in the range of 0.4:1 to 1.2:1.

2. A profoamer as defined in claim 1 wherein $n$ is 2, $R''$ contains from 1 to 6 carbon atoms, $R'$ contains from 3 to 6 carbon atoms, at least one R is a hydrogen atom, and any other R contains no more than 6 carbon atoms.

3. A profoamer as defined in claim 2 wherein $R''$ is a methyl radical, $R'$ is ---$CH_2CH(CH_3)CH_2$---, one R is a hydrogen atom, and the other R is $H_2NCH_2CH_2$---.

4. A profoamer as defined in claim 1 wherein $n$ is 1, $R''$ contains from 1 to 6 carbon atoms, $R'$ contains from 3 to 6 carbon atoms, at least one R is a hydrogen atom, and any other R contains no more than 6 carbon atoms.

5. A profoamer as defined in claim 4 wherein $R''$ is a methyl radical, $R'$ is $(CH_2)_3$---, one R is a hydrogen atom, and the other R is $H_2NCH_2CH_2$---.

6. A profoamer as defined in claim 1 wherein $n$ is 0, $R'$ contains from 3 to 6 carbon atoms, at least one R is a hydrogen atom, and any other R contains no more than 6 carbon atoms.

7. A profoamer as defined in claim 6 wherein $R'$ is ---$(CH_2)_3$---, one R is a hydrogen atom, and the other R is $H_2NCH_2CH_2$---.

8. A profoamer as defined in claim 6 wherein $R'$ is ---$(CH_2)_3$---, one R is a hydrogen atom, and the other R is a methyl radical.

9. A profoamer as defined in claim 6 wherein $R'$ is ---$(CH_2)_3$---, one R is a hydrogen atom, and the other R is a butyl radical.

10. A profoamer as defined in claim 6 wherein R' is —(CH$_2$)$_3$—, and each R is a hydrogen atom.

References Cited

UNITED STATES PATENTS

| 2,738,357 | 3/1956 | Speier | 260—448.2 N |
|---|---|---|---|
| 2,921,950 | 1/1960 | Jex et al. | 260—448.2 N |
| 2,762,823 | 9/1956 | Speier, Jr. | 260—448.2 N |
| 2,754,311 | 7/1956 | Elliott | 260—448.2 N |

DANIEL E. WYMAN, Primary Examiner

P. F. SHAVER, Assistant Examiner

U.S. Cl. X.R.

260—2.5 R, 2.5 N